United States Patent
Ma

(10) Patent No.: US 8,311,097 B2
(45) Date of Patent: Nov. 13, 2012

(54) IMAGE PROCESSING METHOD FOR ADAPTIVE SPATIAL-TEMPORAL RESOLUTION FRAME

(75) Inventor: Guoqiang Ma, Shenzhen (CN)

(73) Assignee: Shenzhen Temobi Science & Tech Co., Ltd., ShenZhen (CN)

( * ) Notice: Subject to any disclaimer, the term of this patent is extended or adjusted under 35 U.S.C. 154(b) by 182 days.

(21) Appl. No.: 12/746,175

(22) PCT Filed: Aug. 28, 2009

(86) PCT No.: PCT/CN2009/073590
§ 371 (c)(1),
(2), (4) Date: Jun. 4, 2010

(87) PCT Pub. No.: WO2010/078759
PCT Pub. Date: Jul. 15, 2010

(65) Prior Publication Data
US 2011/0058605 A1 Mar. 10, 2011

(30) Foreign Application Priority Data
Jan. 9, 2009 (CN) .......................... 2009 1 0104868

(51) Int. Cl.
*H04N 11/02* (2006.01)

(52) U.S. Cl. .............................. 375/240.02; 375/240.13
(58) Field of Classification Search ........... 375/240.02–240.03, 204.12
See application file for complete search history.

(56) References Cited

U.S. PATENT DOCUMENTS

| | | | |
|---|---|---|---|
| 6,891,889 B2 * | 5/2005 | Kim et al. | 375/240.03 |
| 7,797,723 B2 * | 9/2010 | Demircin et al. | 725/143 |
| 2008/0291500 A1 * | 11/2008 | Asai | 358/3.06 |
| 2009/0046952 A1 * | 2/2009 | Ben-Ezra et al. | 382/299 |
| 2009/0087032 A1 * | 4/2009 | Boyd et al. | 382/107 |
| 2011/0013692 A1 * | 1/2011 | Cohen et al. | 375/240.02 |
| 2011/0103473 A1 * | 5/2011 | Li et al. | 375/240.12 |

* cited by examiner

*Primary Examiner* — David Czekaj
*Assistant Examiner* — Leron Beck

(57) ABSTRACT

An image processing method for RDO based adaptive spatial-temporal resolution frame is provided for significantly reducing distortion of the decoded video image, which is resulted from over-compression or over-quantization by the encoder in a low code rate. By employing such image processing method, when the encoder detects that the allocated code rate is below the critical point, most appropriated temporal resolution and spatial resolution in an allocated specific code rate are found automatically based on the principle of rate distortion optimization, then after the decoding of the decoder, the resolution of the input image is recovered according to a certain algorithm.

10 Claims, 6 Drawing Sheets

IMAGE PROCESSING METHOD FOR ADAPTIVE SPATIAL-TEMPORAL RESOLUTION FRAME

FIELD OF THE INVENTION

The present invention generally relates to video image processing field, and more particularly, to an image processing method for adaptive spatial-temporal resolution frame.

BACKGROUND OF THE INVENTION

In an application field of narrowband video communication, the bit-rate for video image encoding needs to be reduced due to a limitation of the transmission bandwidth. With a lower bit-rate, the transmitted image is most probably in an over-compression state, and effects (such as blocking effect and quantization noise) resulted from this, will bring damage to the subjective quality of the video image obviously. In a encoder, over-compression mainly results from over-quantization, and there are two specific cases: (1) a too high quantization coefficient Qp brings a too large quantization step, thereby detail changes of the video image can not be reflected, thus a high frequency component of the video image is badly distorted, and detail loss of the video image is serious. (2) Macroblock boundary effect, as the macroblocks at two side edges of a video image frame may have different coding modes, and the each macroblock may select different quantization coefficients, which result in a break of boundary energy of the video image, that is, the boundaries of the compressed and encoded adjacent image blocks are discontinuous, which resulting in a obvious blocking effect. In the conventional international standards for video image compression and encoding techniques, for example H261/H263/H264, MPEG4 and so on, the image information in spatial domain is generally converted into frequency domain based on discrete cosine transform (DCT) method, and then some of the converted DCT coefficients are quantized and coded. The blocking effect generated in the video images communication compressed in a low bit-rate by a traditional encoding and compression method is one of the important factors which results in image distortion. The blocking effect seriously affects the subjective quality and objective quality (PSNR) of video image communication.

It is proved by experiments that, for a given input image, there is a critical point when decreasing the allocated bit-rate during the encoding process. When the allocated bit-rate is below the critical point, the reconstructed image cannot reserve enough image texture information in an original temporal resolution and spatial resolution. The present invention provides a new method for video image processing, that is, an image processing method for Rate Distortion Optimization (RDO) based Adaptive spatial-temporal Resolution Frame (AstRF), wherein, when the encoder detects that the allocated bit-rate is below the critical point, appropriated temporal resolution and spatial resolution in an allocated specific bit-rate are found automatically based on the principle of rate distortion optimization, then after the decoding of the decoder, the resolution of the input image is recovered according to a certain algorithm. The image processing method in accordance with embodiments of the present invention may obviously reduce damage to the subjective quality of the video image, which is resulted from over-compression of the transmitted video image in low bit-rate.

SUMMARY OF THE INVENTION

In view of the problems in the prior art that the subjective quality and objective quality of the video image are seriously influenced due to over-compression, the present invention relates to an image processing method for RDO based adaptive spatial-temporal resolution frame.

In one aspect, an image processing method for RDO based adaptive spatial-temporal resolution frame is provided, comprising:

A. computing and obtaining a condition value of a critical bit-rate by an encoder based on the input video image and a change of the target allocated bit-rate;

B. comparing the condition value of the critical bit-rate with a threshold value by the encoder, and obtaining an image resolution appropriate for the target allocated bit-rate via down-sampling, if the condition value of critical bit-rate is lower than the threshold, i.e., the target allocated bit-rate is lower than the critical bit-rate, otherwise performing a general encoding process;

C. recovering an original resolution of the received image by a decoder via up-sampling and smoothing it.

Advantageously, said computing and obtaining a condition value of a critical bit-rate in said step A is performed according to following formulas:

$$Risual_{x,y,k} = H \times (C_{x,y,k} - P_{x,y,k}) \times H^T$$

$$Score = \frac{256}{N} \sum_{x,y=0}^{X,Y} (Risual_{x,y,k} \cdot T_{x,y,k}) \cdot \sqrt{0.85 \cdot Qp^{\frac{2}{3}}}$$

Wherein, $C_{x,y,k}$ represents a reconstructed image generated from encoding and then decoding $S_{x,y,k}$, $S_{x,y,k}$ represents an image at a time k;

$P_{x,y,k}$ represents, H is a space-frequency transformation matrix designated by any encoder;

$Risual_{x,y,k}$ represents a distribution in frequency domain of a residual generated by encoding $C_{x,y,k}$;

Wherein, Qp is a quantization parameter, N is a number of pixels in an area involved in the computing, and $T_{x,y,k}$ is a weight properly added in the high-frequency component, the value of which is selected as below:

$$T_{x,y,k} = \begin{matrix} 1 & 1 & 1 & 1 \\ 1 & 1 & 2 & 8 \\ 1 & 2 & 16 & 8 \\ 1 & 8 & 8 & 16 \end{matrix}$$

$$H = \begin{matrix} 1 & 1 & 1 & 1 \\ 2 & 1 & -1 & -2 \\ 1 & -1 & -1 & 1 \\ 1 & -2 & 2 & -1 \end{matrix}$$

$$H^T = \begin{matrix} 1 & 2 & 1 & 1 \\ 1 & 1 & -1 & -2 \\ 1 & -1 & -1 & 2 \\ 1 & -2 & 1 & -1 \end{matrix}$$

Score is the condition value of the critical bit-rate.

Advantageously, the threshold value in said step B changes according to different scenes in a range from 0.1 to 0.95.

Advantageously, said step B further comprises:

B1. obtaining an image spatial resolution appropriate for the target allocated bit-rate via down-sampling;

B2. obtaining an image temporal resolution appropriate for the target allocated bit-rate via down-sampling.

Advantageously, the step B1 further comprises:

B11. setting a set of templets for image spatial resolution;

B12. selecting an optimum templet from the set of templets as the image spatial resolution appropriate for the target allocated bit-rate based on the RDO scheme.

Advantageously, the RDO scheme in said step B12 utilizes a Lagrangian linear approximation method to realize rate distortion optimization, with a formula as below:

$$J=R(p)+pD(p)$$

wherein a value $J_i$ is computed via traversing all kinds of coding modes i in the set of templets to minimize J in the formula, that is, a coding mode corresponding to min(J) has the optimal R-D, and its corresponding image resolution is said image spatial resolution.

Advantageously, said down-sampling in said step B2 comprises reducing the temporal resolution by means of frame extracting.

Advantageously, said step C further comprises:

C1. recovering the original resolution of the received image by means of space resampling;

C2. smoothing the image by means of time window smoothing and scene change determination.

Advantageously, said space resampling in said step C1 utilizes a bi-cubic convolution interpolation algorithm, wherein the bi-cubic convolution interpolation algorithm comprises a one-dimension cubic convolution interpolation algorithm and a two-dimension cubic convolution interpolation algorithm, and the one-dimension cubic convolution interpolation algorithm is:

$$P'(x) = \sum_{i=0}^{3} W(x - x_i)P(x_i)$$

wherein P'(x) is a point to be interpolated, and $P(x_i)$ is a point in the reference grid, wherein $$W(x) = \begin{cases} (a+2)|x|^3 - (a+3)|x|^2 + 1 & 0 \le |x| < 1 \\ a|x|^3 - 5a|x|^2 + 8a|x| - 4a & 1 \le |x| < 2 \\ 0 & |x| \ge 2 \end{cases},$$

the parameter a=−0.5, wherein W(x) is a closest approximate fitting expression of a function $$H(x) = \frac{\sin(x \cdot \pi)}{x \cdot \pi}; \text{ and}$$

the two-dimension cubic convolution interpolation algorithm is:

$$P'(x, y) = \sum_{j=0}^{3} W(y - y_j) \cdot \left( \sum_{i=0}^{3} W(x - x_i) P(x_i, y_j) \right)$$

wherein P'(x, y) is a point to be interpolated, and $P(x_i, y_j)$ is a point in the reference grid.

Advantageously, the step of scene change determination in said step C2 comprises:

C21. analyzing a current macroblock, selecting optimal intra-frame and inter-frame coding modes, and computing a cost function value for intra-frame coding and a cost function value for inter-frame coding by a Lagrangian rate distortion model with the following formulas:

$$\text{IntraCostInMb}=SATD+\lambda \times R\text{bit(Infra)}$$

$$\text{InterCostInMb}=SAD+\lambda \times R\text{bit(Inter)}$$

wherein IntraCostInMb is the cost function value for intra-frame coding, InterCostInMb is the cost function value for inter-frame coding, λ is a Lagrange factor, SATD is a sum of the prediction stagger absolute values of a 4×4 block which is converted with a Hardman Transform, SAD is a sum of absolute errors, and Rbit is a bit number of the coded output using the corresponding coding parameters;

C22. accumulating the cost function value for intra-frame coding and the cost function value for inter-frame coding of each macroblock in the current image, and analyzing the whole frame image to obtain a total cost function value for intra-frame coding and a total cost function value for inter-frame coding, wherein if the total cost function value for inter-frame coding is larger than a product of the total cost function value for intra-frame coding and a sensitive coefficient, a scene change occurs, otherwise no scene change occurs, wherein the sensitive coefficient is in a range from 0.1 to 0.9.

In accordance with the image processing method for RDO based adaptive spatial-temporal resolution frame of the present invention, when the encoder detects that the allocated bit-rate is below the critical point, most appropriated temporal resolution and spatial resolution in an allocated specific bit-rate are found automatically based on the principle of rate distortion optimization, then after the decoding of the decoder, the resolution of the input image is recovered according to a certain algorithm. The image processing method in accordance with the present invention may obviously reduce damage to the subjective quality of the video image, which is resulted from over-compression of the transmitted video image in a low bit-rate, and may maintain quality of the image while reducing the computation complexity.

BRIEF DESCRIPTION OF THE DRAWINGS

The accompanying drawings illustrate one or more embodiments of the invention and, together with the written description, serve to explain the principles of the invention, and wherein.

DETAILED DESCRIPTION OF THE INVENTION

These and other aspects of the present invention will become apparent from the following description of the preferred embodiment taken in conjunction with the following drawings. It should be understood that the embodiments described here are only for the purposes of illustration and description and is not intended to be exhaustive or to limit the invention to the precise forms disclosed.

Figure 1:
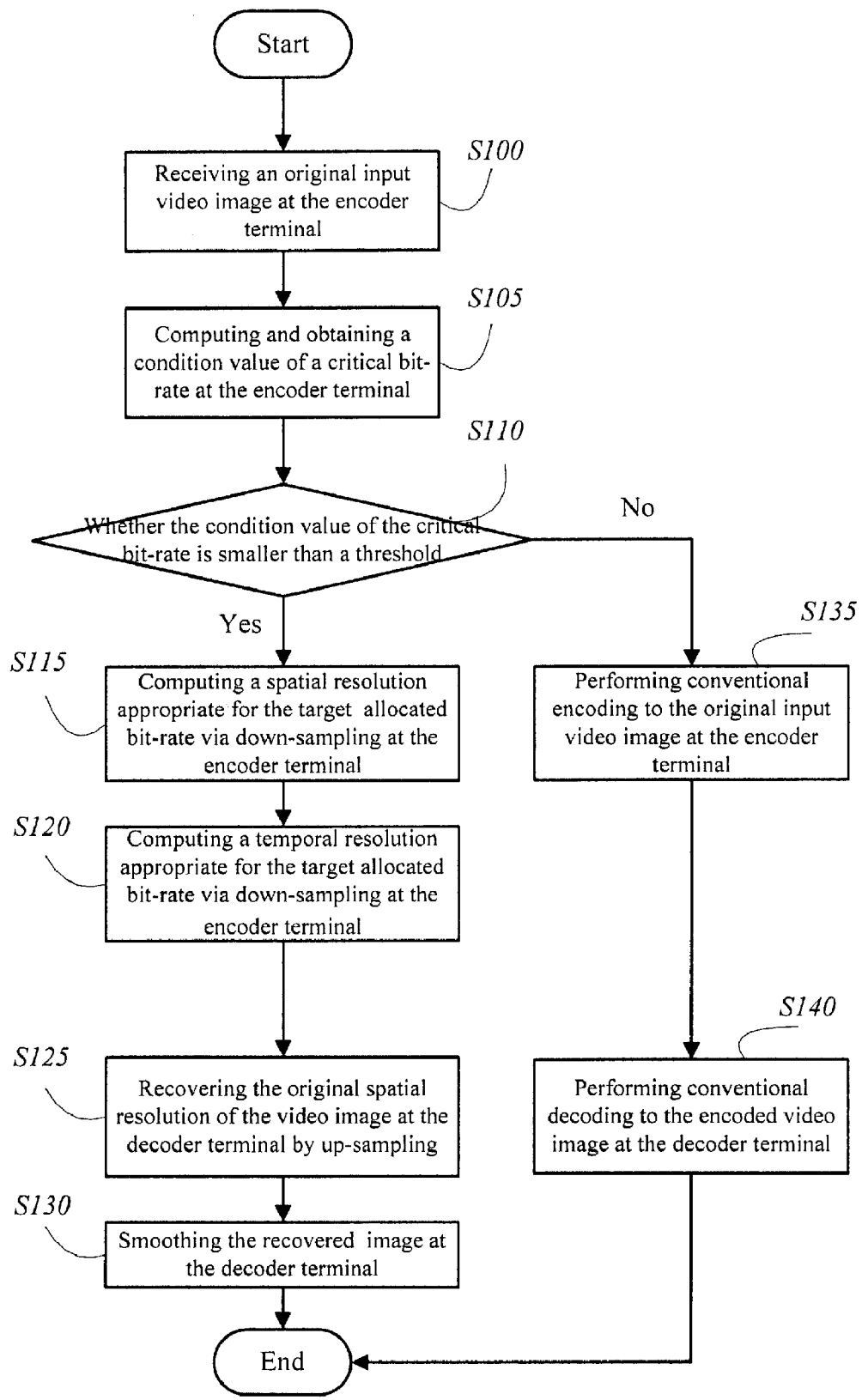
FIG. 1 is a flow diagram of an image processing method for adaptive spatial-temporal resolution frame in accordance with a proffered embodiment of the present invention.

FIG. 1 is a flow diagram of an image processing method for adaptive spatial-temporal resolution frame in accordance with a proffered embodiment of the present invention. The process of the method is as below:

In step S100, an original input video image is received at the encoder terminal.

In step S105, a condition value of a critical bit-rate is computed and obtained at the encoder terminal by means of:

Assuming $S_{x,y,k}$ represents an image at a time k, t represents a target bit-rate, and $S^r_{x,y,k}$ represents a generated image after resampling, thus $$S^r_{x',y',k} = R(S_{x,y,k})$$

Wherein, R(.) represents a down-sampling function. Given $C_{x,y,k}$ represents a reconstructed image generated from encoding and then decoding $S_{x,y,k}$, and $C^r_{x,y,k}$ represents an image generated from encoding and then decoding $S^r_{x,y,k}$, $D_{x,y,k}$ represents a distortion generated from encoding $S_{x,y,k}$, thus:

$D_{x,y,k} = S_{x,y,k} - C_{x,y,k}$; given $D^r_{x,y,k}$ represents a distortion generated from encoding $S^r_{x,y,k}$ and then recovering the resolution, then:

$$D^r_{x,y,k} = S_{x,y,k} - U(C^r_{x,y,k})$$

Wherein, U(.) represents an up-sampling function.

Given $Risual_{x,y,k}$ represents a distribution of a residual in frequency domain obtained by encoding $C_{x,y,k}$. The value of $Risual_{x,y,k}$ refers to Equation 4, wherein H is a space-frequency transformation matrix designated by any encoder.

$$Risual_{x,y,k} = H \times (C_{x,y,k} - P_{x,y,k}) \times H^T$$

$$Score = \frac{256}{N} \sum_{x,y=0}^{X,Y} (Risual_{x,y,k} \cdot T_{x,y,k}) \cdot \sqrt{0.85 \cdot Qp^{\frac{2}{3}}}$$

wherein Qp is a quantization parameter, N is a number of pixels in an area involved in the computing, and $T_{x,y,k}$ is a weight properly added in the high-frequency component, the value of which is selected as below:

$$T_{x,y,k} = \begin{matrix} 1 & 1 & 1 & 1 \\ 1 & 1 & 2 & 8 \\ 1 & 2 & 16 & 8 \\ 1 & 8 & 8 & 16 \end{matrix}$$

$$H = \begin{matrix} 1 & 1 & 1 & 1 \\ 2 & 1 & -1 & -2 \\ 1 & -1 & -1 & 1 \\ 1 & -2 & 2 & -1 \end{matrix}$$

$$H^T = \begin{matrix} 1 & 2 & 1 & 1 \\ 1 & 1 & -1 & -2 \\ 1 & -1 & -1 & 2 \\ 1 & -2 & 1 & -1 \end{matrix}$$

Score is the condition value of the critical bit-rate.

In step S110, the condition value of the critical bit-rate, Score, computed by the encoder, is compared with a threshold L to determine whether it is lower than the threshold L. In the scene used in the embodiments of the present invention, the image resolution is 320×240, 10 FPS, and the bit-rate is 50 kbps, the channel is about 60 kbps, and L may be 0.85. If the scene is changed, for example, the bit-rate is changed, etc, the threshold L should be newly adjusted according to experiments. The threshold L has a range from 0.1 to 0.95. If the condition value of the critical core rate (i.e., Score) is lower than the threshold L, then step S115 is performed, otherwise step S135 is performed.

In step S115, a spatial resolution appropriate for the target allocated bit-rate is computed via down-sampling at the encoder terminal, wherein the process is as below:

Firstly, templet is set for the spatial resolution as below:
Vertical scaled down ½
Vertical scaled down ⅓
Vertical scaled down ¼
Horizontal scaled down ½
Horizontal scaled down ⅓
Horizontal scaled down ¼

The specific templets can be designed according to the size of the actual original resolution. After a set of templets is determined, an optimal value is found among these templets based on the principle of RDO. The RDO can be realized by utilizing a Lagrangian linear approximation method as following formula:

$$J = R(p) + pD(p)$$

The value of $J_i$ is computed via traversing all kinds of coding modes i in the set of templets to minimize J in the formula, that is, a coding mode corresponding to min(J) has the optimal R-D, and its corresponding image resolution is the optimal resolution.

In step S120, a temporal resolution appropriate for the target allocated bit-rate is computed via down-sampling at the encoder terminal, wherein the process is as below:

An alterable temporal resolution can be realized by temporal hierarchizing (or temporal scalability). By providing a temporal scalable bit flow, the image may be partitioned into a basic hierarchy and one or more enhancement hierarchies provided with following characteristic. These temporal hierarchies can be denoted by time levels. The basic hierarchy is denoted by a time level 0, and the other temporal hierarchies are incrementally denoted, and correspondingly the temporal resolution is increased. For a natural number k, a low level temporal resolution standardized by k may be obtained by removing all temporal (enhancement) hierarchies in the bit flow having a time level larger than k. In a hybrid video codec, a necessary condition for temporal scalability is to allow a motion compensated prediction reference frame of the current predicted frame being restricted in a temporal hierarchy which is below or equal to the current frame. By means of a hierarchical B picture in the encoder, a temporal scalable N-hierarchy 2-order enhancement hierarchy can be obtained.

The temporal basic hierarchy $T_0$, which is encoded independently to all other frames, and starts from an IDR access unit, wherein each frame is encoded by intra-frame coding or utilizing image of the previous basic hierarchy as a reference frame. The basic hierarchies have same encoding manner and display sequence. The picture in the temporal enhancement hierarchy with a time level $T_x$ is always located between two consecutive pictures whose time level are below x. The temporal enhancement hierarchy is coded as a B picture, and its reference frame lists (i.e., list 0 and list 1) are restricted to two sequential pictures which have a time level below x. Each set of temporal hierarchies $\{T_0 \ldots T_x\}$ may be decoded independently to all enhancement hierarchies with a time level Y>X.

The above mentioned temporal scalable hierarchical prediction structure may be combined with a multiple reference frame scheme of the encoder. More than one reference frame may be used in the reference frame list, and pictures having a same time level with the predicted frame may be included in. The hierarchical prediction structure may be a non-second order, and the prediction structure may be modified arbitrarily according to actual coding requirements.

In the temporal hierarchical structure, the temporal reference is limited obviously, thus the rate distortion capability of the encoder is affected inevitably. The following description will introduce how to improve this problem to a certain extent.

The coding efficiency of the hierarchical prediction structure mostly depends on selection of different quantization parameters of the temporal hierarchies. Coding of the basic hierarchy must have a highest fidelity, since it is used directly or indirectly as a motion compensated prediction reference of all other pictures. However, the quantization parameters of the other temporal hierarchies may be incremented per hierarchy, since quality of their reconstructed image can only influence fewer pictures. Selections of the quantization parameters of the basic hierarchy may be accomplished by conventional methods via rate distortion analyse. But for Qp of the enhancement hierarchies, the following method can be utilized to avoid complex computation, which is proved by experiments to have good robustness for video signals having different characteristics.

Assuming the quantization parameter of the basic hierarchy is $QP_0$, for an enhancement hierarchy with a time level k>0, its quantization parameter may be selected as $QP_k=QP_0+3+k$.

Although this method results in huge PSNR fluctuation in a GOP, it has been experimentally proved that the reconstructed result is rather smooth.

In step S125, the original spatial resolution of the video image is recovered at the decoder terminal by up-sampling method, wherein the up-sampling is realized by means of space resampling, that is, the original spatial resolution of the video image is recovered through a bi-cubic convolution interpolation algorithm. The bi-cubic convolution interpolation algorithm comprises a one-dimension interpolation algorithm and a two-dimension interpolation algorithm.

In step S130, the processed image is smoothed at the decoder terminal. The image smoothing comprises a time window smoothing process and a smoothing process by means of scene change determination. The method is ended when the smoothing process is finished.

In step S135, when the condition value of the critical bit-rate (i.e. Score) is not lower than the threshold L, a conventional encoding process is performed to the original input video image at the encoder terminal.

In step S140, a conventional decoding process corresponding to the step S135 is performed to the received encoded video image at the decoder terminal.

Figure 2:
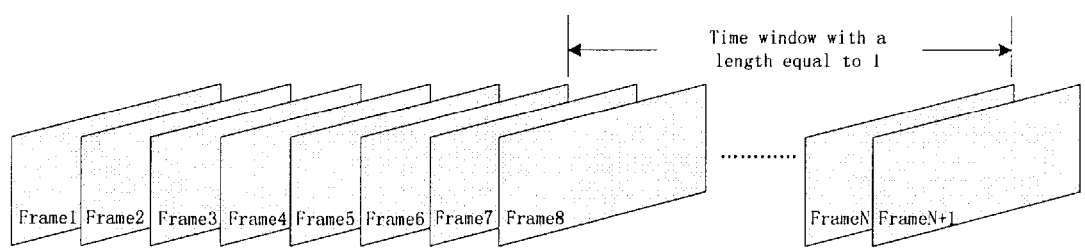
FIG. 2 is a diagram of an exemplary time window for smoothing image in accordance with an embodiment of the present invention.

FIG. 2 is a diagram of an exemplary time window for smoothing image in accordance with an embodiment of the present invention. In the time window, decrease of the spatial resolution is a smooth transition process, let visual perception of the viewers gradually transits. FIG. 2 shows a continuous time window, the whole situation of the window may be summarized, and then the whole window is re-encoded.

Figure 3:
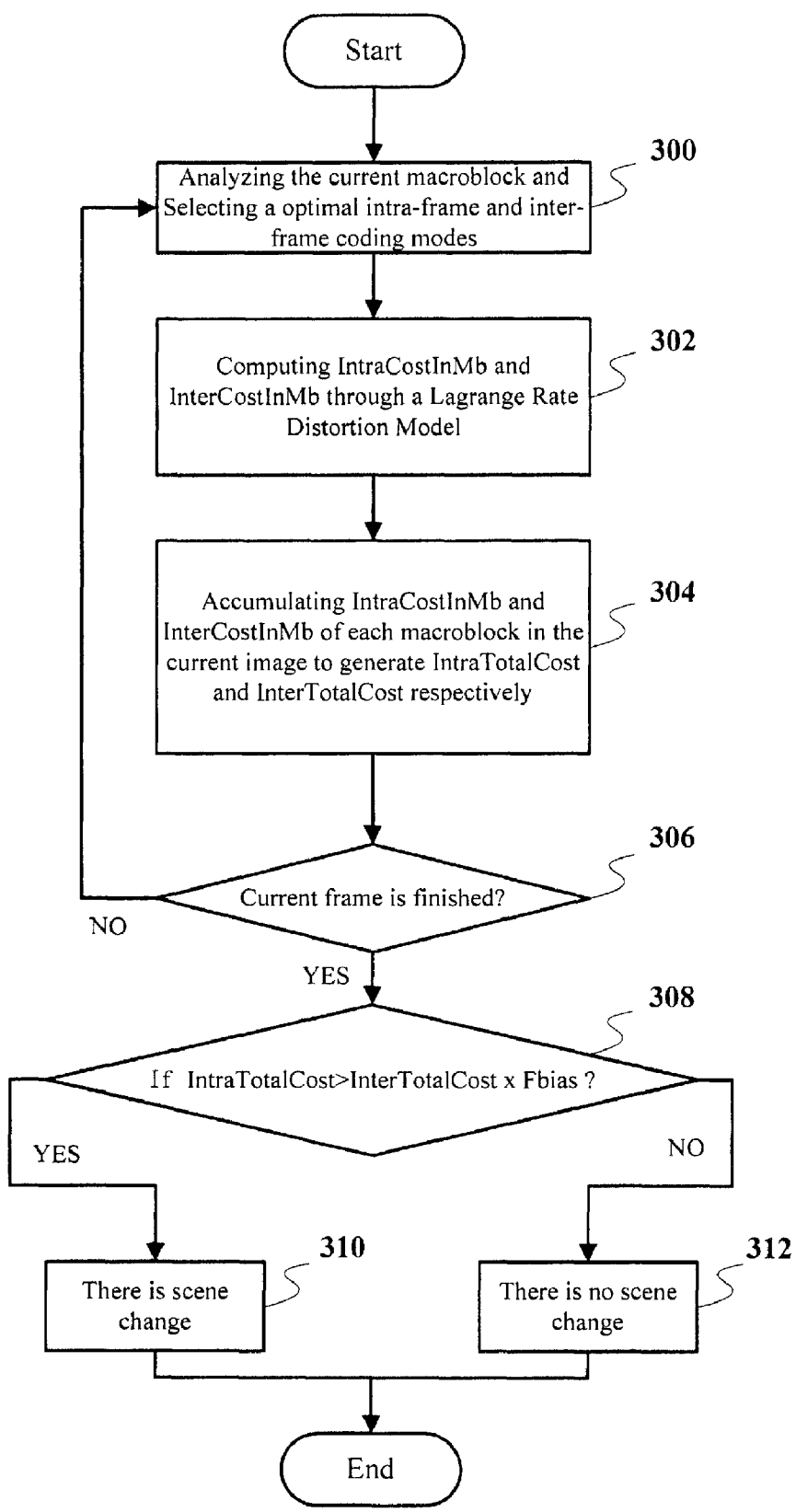
FIG. 3 is flow diagram of a method for scene change determination in accordance with an embodiment of the invention, wherein scene change determination is utilized to smooth the image.

FIG. 3 is flow diagram of a method for scene change determination in accordance with an embodiment of the invention, wherein scene change determination is utilized to smooth the image. The method comprises the following steps:

In step 300, the current macroblock is analyzed, and the optimal intra-frame and inter-frame coding modes is selected.

In step 302, IntraCostInMb and InterCostInMb are computed through a Lagrange Rate Distortion Model. IntraCostInMb and InterCostInMb denote the cost function values for intra-frame coding and inter-frame coding respectively, which are computed as below:

IntraCostInMb=$SATD+\lambda \times R$bit(Intra)

InterCostInMb=$SAD+\lambda \times R$bit(Inter)

wherein $\lambda$ is a Lagrange factor, SATD is a sum of the prediction stagger absolute values of a 4×4 block which is converted with a Hardman Transform, SAD is a sum of absolute errors, and Rbit is a bit number of the coded output using the corresponding coding parameters.

In step 304, the cost function value for intra-frame coding (IntraCostInMb) and the cost function value for inter-frame coding (InterCostInMb) of each macroblock in the current image are accumulated to obtain a total cost function value for intra-frame coding (IntraTotalCost) and a total cost function value for inter-frame coding (InterTotalCost) respectively. The formulas are:

$$IntraTotalCost = \sum_{mb} IntraCostInMb$$

$$InterTotalCost = \sum_{mb} InterCostInMb$$

In step 306, the current frame is determined that whether it is finished or not. If not, returning back to step 300; and if the current frame is not finished, then entering into step 308.

In step 308, when the complete image frame is analysed, whether a scene change occurring in the current image is analyzed and determined according to the obtained total cost function value for intra-frame coding (IntraTotalCost) and total cost function value for inter-frame coding (InterTotalCost). If InterTotalCost>IntraTotalCost×Fbias, it is determined that scene change occurs in this image 310, otherwise there is no scene change 312, wherein Fbias is a sensitive coefficient for scene change determination, which having a value range from 0.1 to 0.9. A too small sensitive coefficient will bring erroneous determination, while a too large sensitive coefficient will result in a slow response to the scene change. For example, when communicating a scene of QVGA (320×240), 10 fps over a 50 kbps channel, a sensitive coefficient of 0.25 is preferably. Value of the sensitive coefficient for other scenes may be adjusted according to actual requirements.

Figure 4:
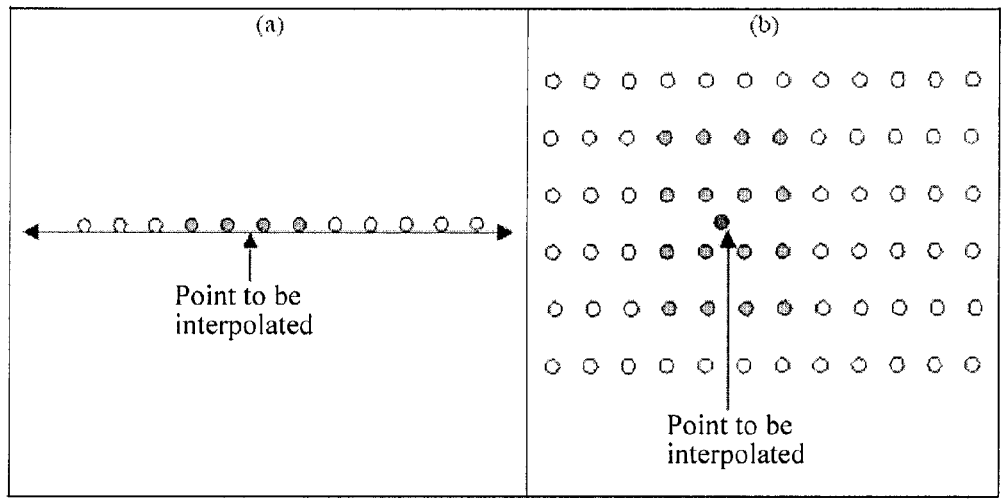
FIG. 4 is a diagram of an exemplary reference grid points necessary for one-dimension interpolation and two-dimension interpolation for space resampling in accordance with an embodiment of the present invention.
Figure 5:
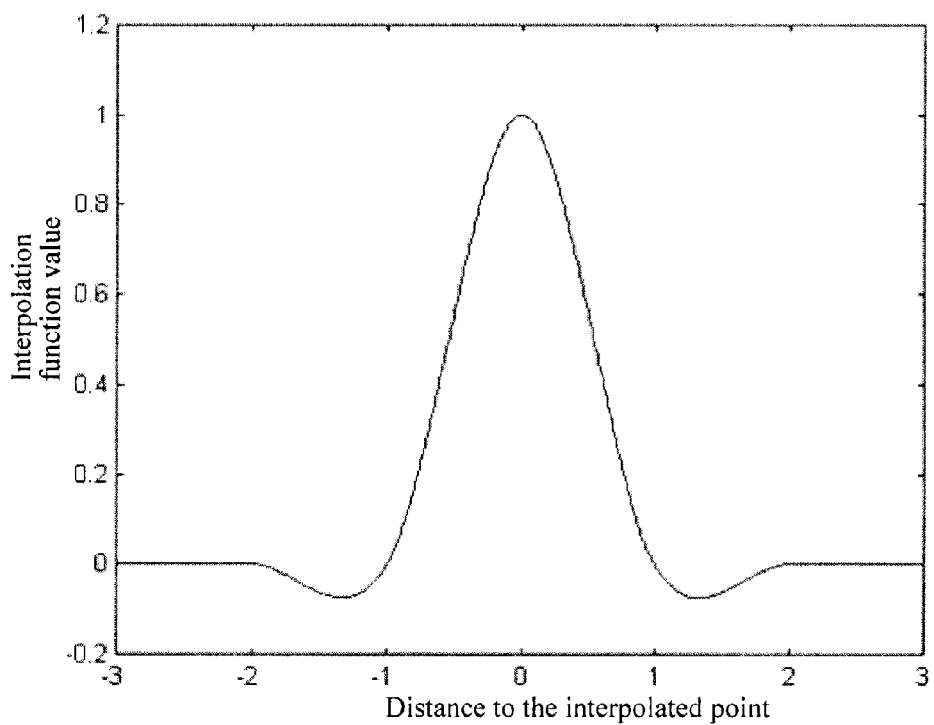
FIG. 5 is a diagram showing a relationship between the cubic convolution interpolation function and the distance for space resampling in accordance with an embodiment of the present invention.

FIG. 4 is a diagram of an exemplary reference grid points necessary for one-dimension interpolation and two-dimension interpolation for space resampling in accordance with an embodiment of the present invention. The space resampling of present invention employs a bi-cubic convolution interpolation. Grey value of the interpolated point may be computed by a weighted average of the grey values of the 16 adjacent original image gird points. The interpolation process comprises a one-dimension interpolation in horizontal direction and a one-dimension interpolation in vertical direction. The one-dimension interpolation each time needs 4 reference grid points, two points at two sides respectively, while the two-dimension interpolation needs total 4×4=16 reference gird points. A kernel function operator for the one-dimension cubic convolution interpolation is:

$$W(x) = \begin{cases} (a+2)|x|^3 - (a+3)|x|^2 + 1 & 0 \le |x| < 1 \\ a|x|^3 - 5a|x|^2 + 8a|x| - 4a & 1 \le |x| < 2 \\ 0 & |x| \ge 2 \end{cases}$$

wherein x is a distance between the point to be interpolated and a point in the reference grid, and the parameter a=−0.5. This kernel function is a closest approximate fitting expression of a function $$H(x) = \frac{\sin(x \cdot \pi)}{x \cdot \pi},$$

and a function image of the function $$H(x) = \frac{\sin(x \cdot \pi)}{x \cdot \pi}$$

is shown in FIG. 5.

The formula for cubic convolution one-dimension interpolation is:

$$P'(x) = \sum_{i=0}^{3} W(x - x_i) P(x_i)$$

wherein P'(x) is a point to be interpolated, and P(x$_i$) is a point in the reference grid. If the reference grid point is located outside the image, a pixel point on the edge of the closest image is used instead. The two-dimension interpolation is a combination of separable one-dimension interpolations in two directions, and its algorithm is:

$$P'(x, y) = \sum_{j=0}^{3} W(y - y_j) \cdot \left( \sum_{i=0}^{3} W(x - x_i) P(x_i, y_j) \right)$$

FIG. 5 is a diagram showing a relationship between the cubic convolution interpolation function and the distance for space resampling in accordance with an embodiment of the present invention. The function represented by this function image is $$H(x) = \frac{\sin(x \cdot \pi)}{x \cdot \pi}.$$

Figure 6:
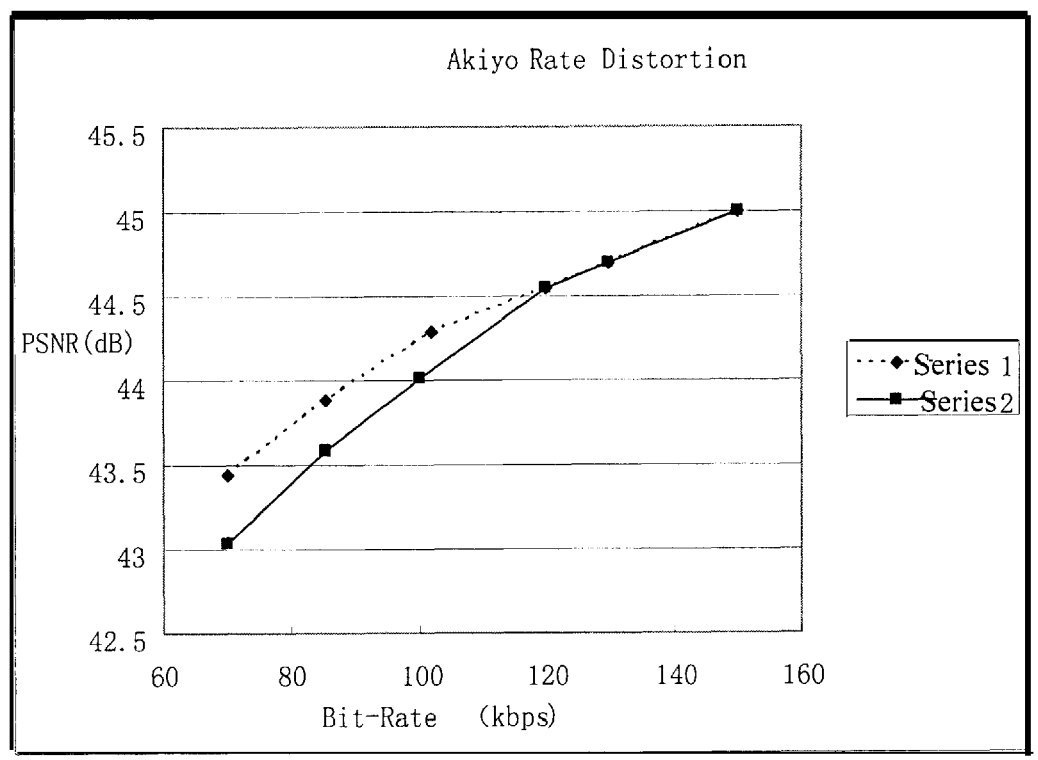
FIG. 6 is a contrast diagram showing rate distortion capabilities between the original resolution coding of the Akiyo image sequence and the method in accordance with an embodiment of the present invention.

FIG. 6 is a contrast diagram showing rate distortion capabilities between the original resolution coding of the Akiyo image sequence and the method in accordance with an embodiment of the present invention.

Figure 7:
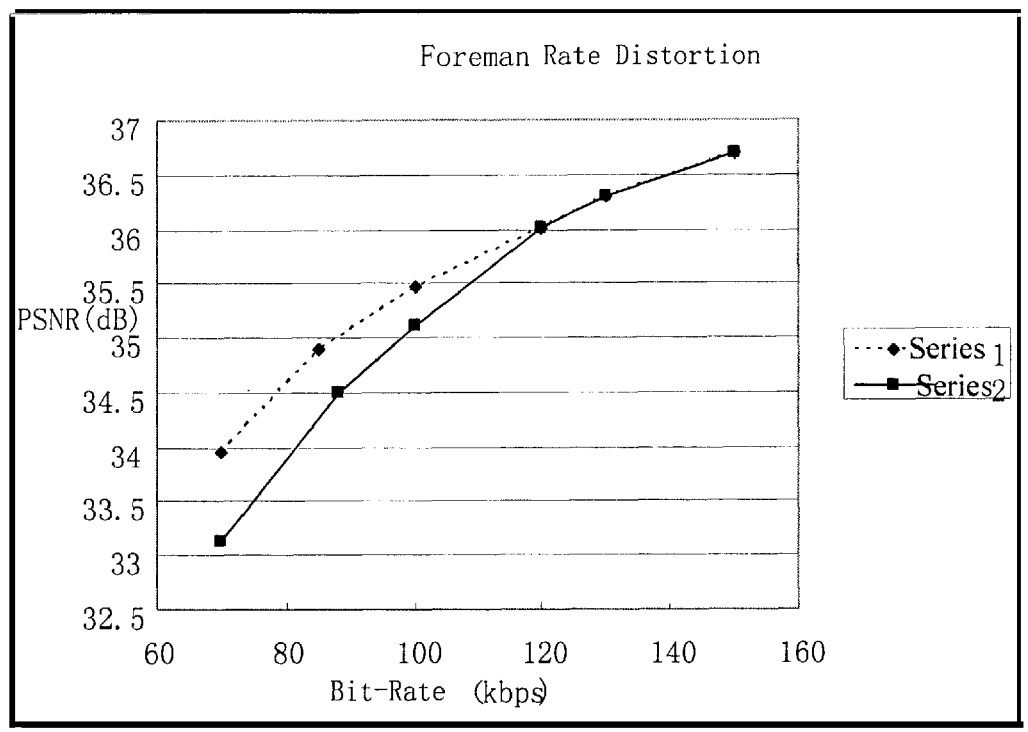
FIG. 7 is a contrast diagram showing rate distortion capabilities between the original resolution coding of the Foreman image sequence and the method in accordance with an embodiment of the present invention.

FIG. 7 is a contrast diagram showing rate distortion capabilities between the original resolution coding of the Foreman image sequence and the method in accordance with an embodiment of the present invention.

Figure 8:
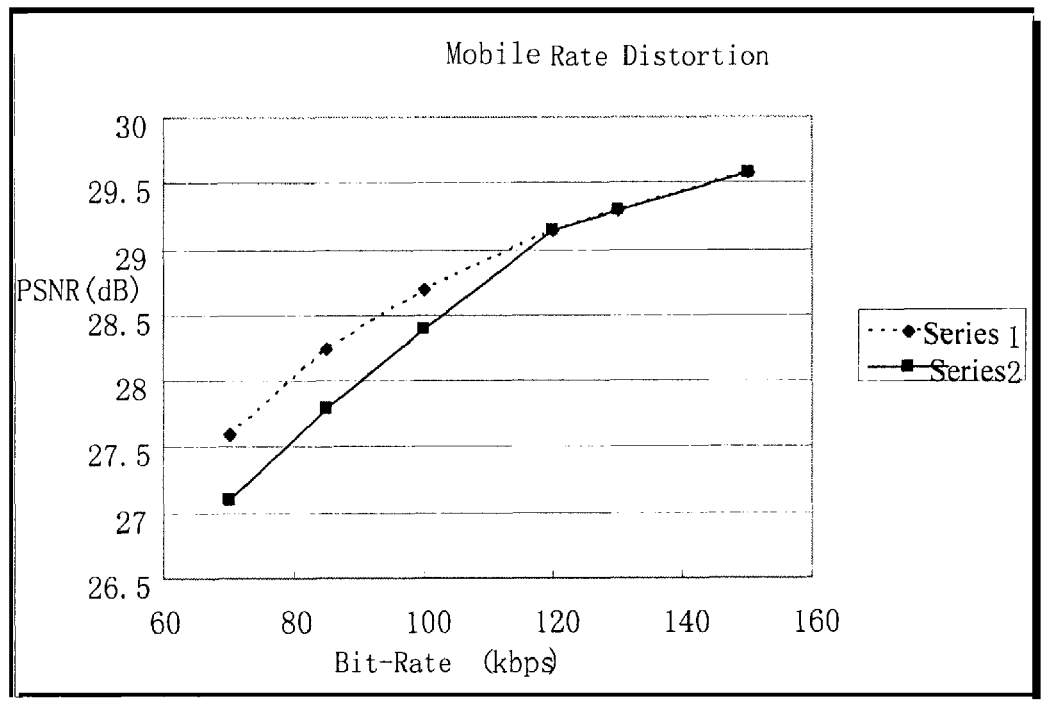
FIG. 8 is a contrast diagram showing rate distortion capabilities between the original resolution coding of the Mobile image sequence and the method in accordance with an embodiment of the present invention.

FIG. 8 is a contrast diagram showing rate distortion capabilities between the original resolution coding of the Mobile image sequence and the method in accordance with an embodiment of the present invention.

Figure 9:
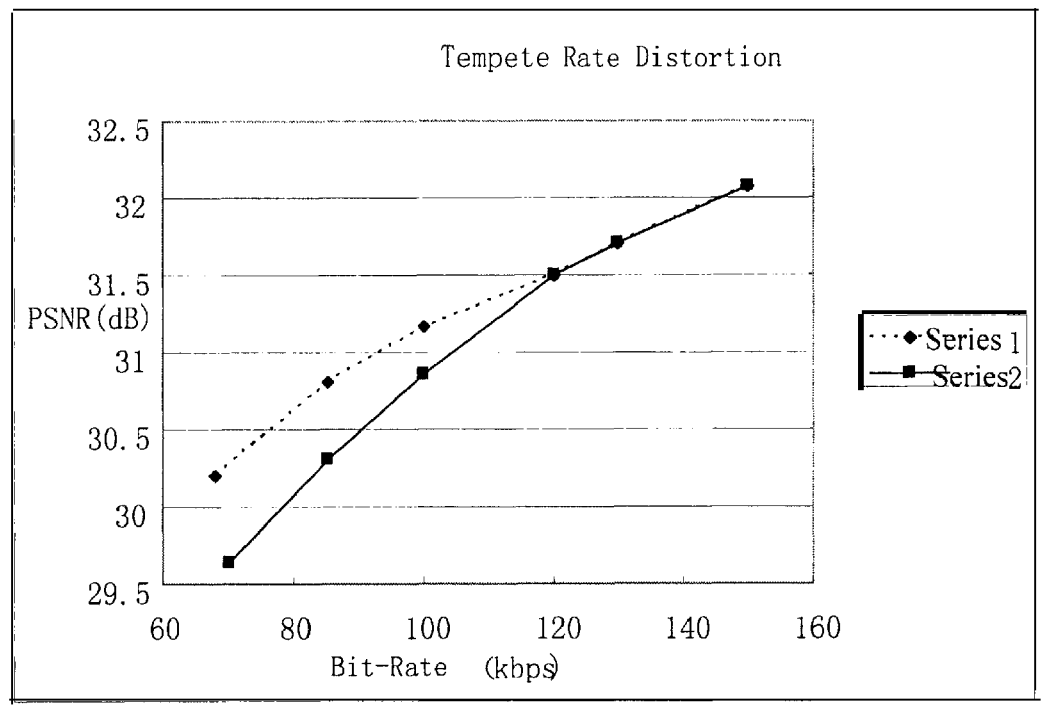
FIG. 9 is a contrast diagram showing rate distortion capabilities between the original resolution coding of the Tempete image sequence and the method in accordance with an embodiment of the present invention.

FIG. 9 is a contrast diagram showing rate distortion capabilities between the original resolution coding of the Tempete image sequence and the method in accordance with an embodiment of the present invention.

FIGS. 6-9 show rate distortion capabilities of Akiyo, Foreman, Mobile and Tempete utilizing the original resolution and the present method respectively. It should be noted here that, computation of PSNR with the original resolution is based on difference between the decoded image and the original image, while the method in accordance with embodiments of the present invention utilizes difference between the decoded image and the resolution-adjusted image to compute PSNR. It can be seen from these figures that, the two curves denoting the original resolution and the method of the present invention respectively, begin to branch at a certain point, which is just the critical bit-rate. After this point, distortion between the curve representing the method of the present invention and the re-sampled image is far lower than the distortion between the coded image with original resolution and the original input image.

The foregoing description of the exemplary embodiments of the invention has been presented only for the purposes of illustration and description and is not intended to be exhaustive or to limit the invention to the precise forms disclosed. Many modifications and variations are possible in light of the above teaching without departing from the protection scope of the present invention.

What is claimed is:

1. An image processing method for RDO based adaptive spatial-temporal resolution frame, comprising:
   A. computing and obtaining a condition value of a critical code rate by an encoder based on the input video image and a change of the target allocated code rate;
   B. comparing the condition value of the critical code rate with a threshold value by the encoder, and obtaining an image resolution appropriate for the target allocated code rate via down-sampling if the condition value of critical code rate is smaller than the threshold, the target allocated code rate is smaller than the critical code rate, otherwise performing a general encoding process;
   C. recovering an original resolution of the received image by a decoder via up-sampling and smoothing it; wherein, said computing and obtaining a condition value of a critical code rate in said step A is performed according to following formulas:

$$Risual_{x,y,k} = H \times (C_{x,y,k} - P_{x,y,k}) \times H^T$$

$$Score = \frac{256}{N} \sum_{x,y=0}^{X,Y} (Risual_{x,y,k} \cdot T_{x,y,k}) \cdot \sqrt{0.85 \cdot Qp^{\frac{2}{3}}}$$

Wherein, $C_{x,y,k}$ represents a reconstructed image generated from encoding and then decoding $S_{x,y,k}$, $S_{x,y,k}$ represents an image at a time k;

$P_{x,y,k}$ represents a predicted image, H is a space-frequency transformation matrix designated by any encoder;

$Risual_{x,y,k}$ represents a distribution in frequency domain of a residual generated by encoding $C_{x,y,k}$;

wherein Qp is a quantization parameter, N is a number of pixels in an area involved in the computing, $T_{x,y,k}$ is a weight properly added in the high-frequency component, and Score is a condition value of the critical code rate.

2. The image processing method for RDO based adaptive spatial-temporal resolution frame according to claim 1, wherein, a value of the weight properly added in the high-frequency component $T_{x,y,k}$ is selected as below:

$$T_{x,y,k} = \begin{matrix} 1 & 1 & 1 & 1 \\ 1 & 1 & 2 & 8 \\ 1 & 2 & 16 & 8 \\ 1 & 8 & 8 & 16 \end{matrix}$$

$$H = \begin{matrix} 1 & 1 & 1 & 1 \\ 2 & 1 & -1 & -2 \\ 1 & -1 & -1 & 1 \\ 1 & -2 & 2 & -1 \end{matrix}$$

$$H^T = \begin{matrix} 1 & 2 & 1 & 1 \\ 1 & 1 & -1 & -2 \\ 1 & -1 & -1 & 2 \\ 1 & -2 & 1 & -1 \end{matrix}.$$

3. The image processing method for RDO based adaptive spatial-temporal resolution frame according to claim 1, wherein the threshold value in said step B changes according to different scenes in a range from 0.1 to 0.95.

4. The image processing method for RDO based adaptive spatial-temporal resolution frame according to claim 1, wherein said step B further comprises:
   B1. obtaining an image spatial resolution appropriate for the target allocated code rate via down-sampling;
   B2. obtaining an image temporal resolution appropriate for the target allocated code rate via down-sampling.

5. The image processing method for RDO based adaptive spatial-temporal resolution frame according to claim 4, wherein the step B1 further comprises:
   B11. setting a set of templets for image spatial resolution;
   B12. selecting an optimum templet from the set of templets as the image spatial resolution appropriate for the target allocated code rate based on the RDO method.

6. The image processing method for RDO based adaptive spatial-temporal resolution frame according to claim 5, wherein the RDO scheme in said step B12 utilizes a Lagrangian linear approximation method to realize rate distortion optimization, with a formula below:

$$J = R(p) + pD(p)$$

wherein a value $J_i$ is computed via traversing all kinds of coding modes i in the set of templets to minimize J in the formula, that is, a coding mode corresponding to min(J) has the optimal R-D, and its corresponding image resolution is said image spatial resolution.

7. The image processing method for RDO based adaptive spatial-temporal resolution frame according to claim 4, wherein said down-sampling in said step B2 comprises reducing the temporal resolution by means of frame extracting.

8. The image processing method for RDO based adaptive spatial-temporal resolution frame according to claim 1, wherein said step C further comprises:
   C1. recovering the original resolution of the received image by means of space resampling;
   C2. smoothing the image by means of time window smoothing and scene change determination.

9. The image processing method for RDO based adaptive spatial-temporal resolution frame according to claim 8, wherein said space resampling in said step C1 utilizes a bi-cubic convolution interpolation algorithm, wherein the bi-cubic convolution interpolation algorithm comprises a one-dimension cubic convolution interpolation algorithm and a two-dimension cubic convolution interpolation algorithm, and the one-dimension cubic convolution interpolation algorithm is:

$$P'(x) = \sum_{i=0}^{3} W(x - x_i) P(x_i)$$

wherein P'(x) is a point to be interpolated, and $P(x_i)$ is a point in the reference grid, wherein $$W(x) = \begin{cases} (a+2)|x|^3 - (a+3)|x|^2 + 1 & 0 \leq |x| < 1 \\ a|x|^3 - 5a|x|^2 + 8a|x| - 4a & 1 \leq |x| < 2 \\ 0 & |x| \geq 2 \end{cases},$$

the parameter a=−0.5, wherein W(x) is a closest approximate fitting expression of a function $$H(x) = \frac{\sin(x \cdot \pi)}{x \cdot \pi}; \text{ and}$$

the two-dimension cubic convolution interpolation algorithm is:

$$P'(x, y) = \sum_{j=0}^{3} W(y - y_j) \cdot \left( \sum_{i=0}^{3} W(x - x_i) P(x_i, y_j) \right)$$

wherein P'(x, y) is a point to be interpolated, and $P(x_i, y_j)$ is a point in the reference grid.

10. The image processing method for RDO based adaptive spatial-temporal resolution frame according to claim 8, wherein the step of scene change determination in said step C2 comprises:
   C21. analyzing a current macroblock, selecting optimal intra-frame and inter-frame coding modes, and computing a cost function value for intra-frame coding and a cost function value for inter-frame coding by a Lagrangian rate distortion model with the following formulas:

$$\text{IntraCostInMb} = SATD + \lambda \times R\text{bit(Infra)}$$

$$\text{InterCostInMb} = SAD + \lambda \times R\text{bit(Inter)}$$

wherein IntraCostInMb is the cost function value for intra-frame coding, InterCostInMb is the cost function value for inter-frame coding, λ is a Lagrange factor, SATD is a sum of the prediction stagger absolute values of a 4×4 block which is converted with a Hardman Transform, SAD is a sum of absolute errors, and Rbit is a bit number of the coded output using the corresponding coding parameters;

C22. accumulating the cost function value for intra-frame coding and the cost function value for inter-frame coding of each macroblock in the current image, and analyzing the whole frame image to obtain a total cost function value for intra-frame coding and a total cost function value for inter-frame coding, wherein if the total cost function value for inter-frame coding is larger than a product of the total cost function value for intra-frame coding and a sensitive coefficient, a scene change occurs, otherwise there is no scene change, wherein the sensitive coefficient is in a range from 0.1 to 0.9.

* * * * *